(12) United States Patent
Tanaka

(10) Patent No.: US 7,797,101 B2
(45) Date of Patent: Sep. 14, 2010

(54) ROAD MAP DISPLAY SYSTEM FOR VEHICLE

(75) Inventor: Hiroyuki Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 701 days.

(21) Appl. No.: 11/819,546

(22) Filed: Jun. 28, 2007

(65) Prior Publication Data
US 2008/0040022 A1 Feb. 14, 2008

(30) Foreign Application Priority Data
Aug. 11, 2006 (JP) .............................. 2006-220234

(51) Int. Cl.
*G06F 17/00* (2006.01)
(52) U.S. Cl. ....................... 701/117; 701/118; 701/119; 701/208
(58) Field of Classification Search ......... 701/117–119, 701/200–213; 340/907, 910, 931, 988, 990
See application file for complete search history.

(56) References Cited

U.S. PATENT DOCUMENTS 7,526,377 B2 * 4/2009 Wiener et al. ............... 701/200
7,629,899 B2 * 12/2009 Breed ......................... 340/903
7,706,965 B2 * 4/2010 Downs et al. ............... 701/117

FOREIGN PATENT DOCUMENTS

| JP | A-05-67294 | 3/1993 |
| JP | A-2002-71365 | 3/2002 |
| JP | A-2003-322535 | 11/2003 |
| JP | A-2006-133148 | 5/2006 |

* cited by examiner

*Primary Examiner*—Richard M. Camby
(74) *Attorney, Agent, or Firm*—Posz Law Group, PLC

(57) ABSTRACT

A road assigned with speed limit information displayed in a display unit is extracted as a determination target road. Whether congestion information for the determination target road is acquired is determined. The determination target road, for which congestion information is acquired, is extracted as a display-switching target road. A display form of speed limit information of the display-switching target road is switched from a usual display form to a congestion display form to thereby inform a user of a presence of the congestion information.

7 Claims, 3 Drawing Sheets

ROAD MAP DISPLAY SYSTEM FOR VEHICLE

CROSS REFERENCE TO RELATED APPLICATION

This application is based on and incorporates herein by reference Japanese Patent Application No. 2006-220234 filed on Aug. 11, 2006.

FIELD OF THE INVENTION

The present invention relates to a road map display system to display a road map, which includes a vehicle position and a legal speed limit for a road.

BACKGROUND OF THE INVENTION

A conventional navigation apparatus receives congestion information from a road traffic management center to thereby display the received congestion information on a road map in a display unit. Thus, a user is notified of the congestion on a road (see Patent document 1).

Another apparatus displays a legal speed limit on a road on which a subject vehicle travels to thereby inform a driver of the speed limit (see Patent document 2).

Each of the congestion information and the speed limit is displayed on each display unit; therefore, both cannot be displayed at the same time on a single screen window in a display unit. For instance, multiple roads may be selectable as a route. A first road has a high speed limit and is congested, while a second road has a low speed limit and is not congested. In this case, a user needs a time in determining which road, the first or the second, should be selected.

Patent document 1: JP-2002-71365 A
Patent document 2: JP-H5-67294 A

SUMMARY OF THE INVENTION

It is an object of the present invention to allow a user to easily discern a legal speed limit and congestion information of a road on a map displayed in a map display system at the same time.

To achieve the above object, as an example of the present invention, a road map display system for a vehicle is provided as follows. A position detector is included for detecting a current position of the vehicle. A map data storing unit is included for storing road map data. A display controller is included for displaying a road map, speed limit information of a road, and the current position of the vehicle in a display unit based on the stored road map data. A congestion information acquisition unit is included for acquiring congestion information for a road from an outside information center. A display-switching target road selection unit is included for (i) defining a road, of which speed limit information is displayed by the display controller, as a determination target road, (ii) determining whether congestion information for the determination target road is acquired, and (iii) defining the determination target road, for which congestion information is acquired, as a display-switching target road. A display form switching unit is included for switching a display form of speed limit information of the display-switching target road from a usual display form to a congestion display form for informing a user of a presence of the congestion information.

According to another example of the present invention, a method is provided for superimposing speed limit information on a road map. The method comprises the steps of: detecting a current position of a vehicle; displaying a road map, speed limit information of a road, and the current position of the vehicle in a display unit based on road map data; acquiring congestion information for a road from an outside information center; defining a road, of which speed limit information is displayed in the display unit, as a determination target road; determining whether congestion information for the determination target road is acquired; defining the determination target road, for which congestion information is acquired, as a display-switching target road; and switching a display form of speed limit information of the display-switching target road from a usual display form to a congestion display form for informing a user of a presence of the congestion information.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A map display system according to an embodiment of the present invention is directed to a navigation apparatus provided in a vehicle.

Figure 1:
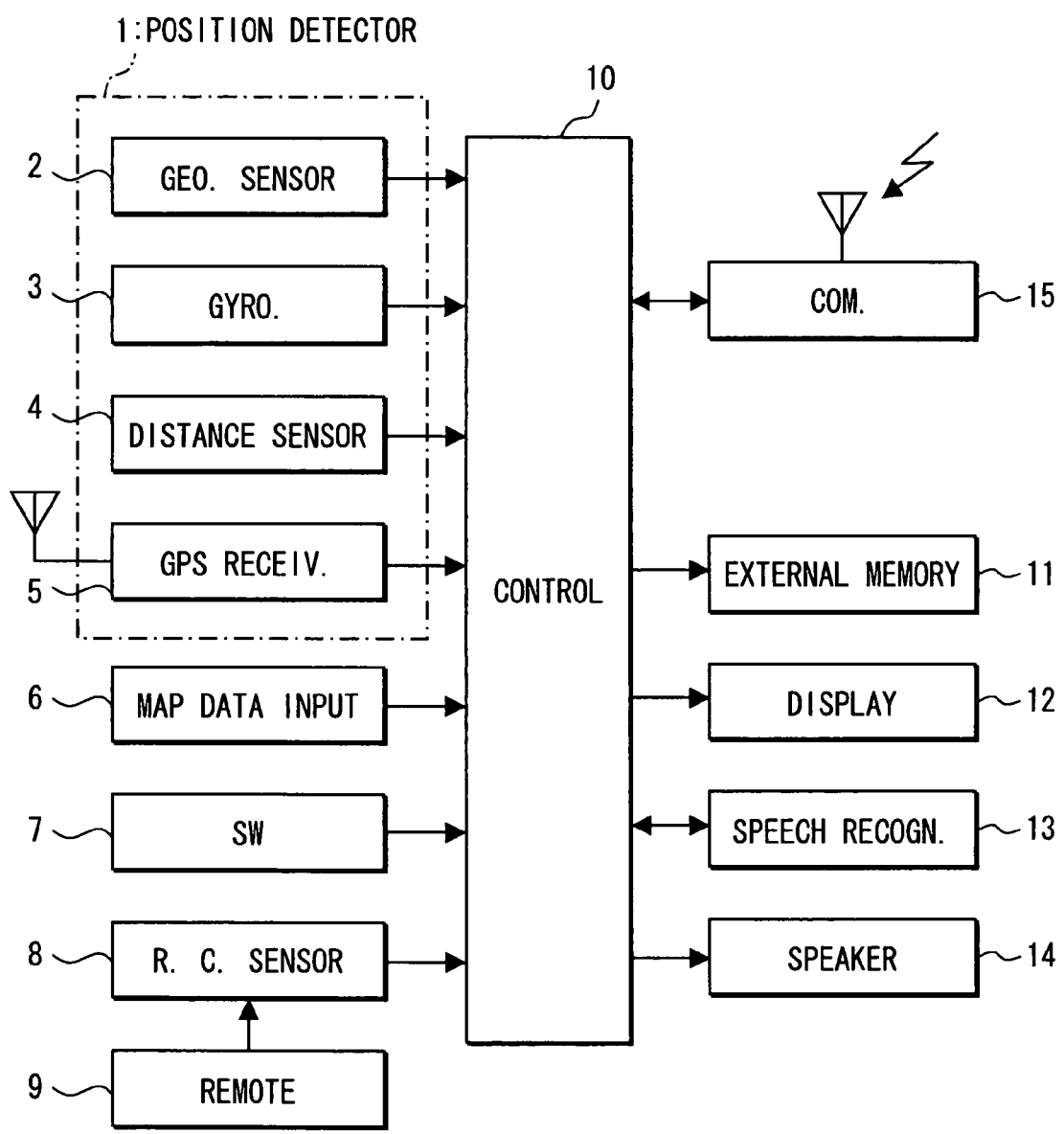
FIG. 1 is a block diagram illustrating an overall configuration of a navigation apparatus according to an embodiment.

As shown in FIG. 1, the navigation apparatus includes a position detector 1, a map data input unit 6, an operation switch group 7, a remote control sensor 8, a remote 9, an external memory device 11, a display device 12, a speech recognition unit 13, a speaker 14, a communicator 15, and a control circuit 10 connected with the foregoing.

The control circuit 10 is a usual computer having a known CPU, ROM, RAM, Input/Output, and bus line connecting the foregoing. The ROM stores programs, which are executed by the computer in the control circuit 10 and instruct the CPU to process. The control circuit 10 reads out data stored in the external memory device 11 and writes data in the external memory device 11.

The position detector 1 includes known sensors such as a geomagnetic sensor 2, gyroscope 3, distance sensor 4, and GPS (Global Positioning System) receiver 5 for detecting a position of the vehicle based on electric waves from satellites. These sensors have individual detection error types; therefore, they are used to complement each other. Depending on the required detection accuracy, some of the above sensors may be used or another sensor may be included.

The map data input unit 6 is used for inputting map data for rendering maps to the control circuit 10. The map data include the following: road map data having node data and link data; background data; and landmark data such as place names. The map data input unit 6 includes a storage medium storing the map data. The storage medium uses a DVD-ROM or hard disk by virtue of a data volume; however, it can use a rewritable storage medium such as a memory card or CD-ROM.

The node data include, with respect to each node, a node ID, node coordinates, a node name, link IDs connected with the node, an intersection type, presence/absence of traffic lights, regulation information, and a node cost.

The link data include, with respect to each link, a link ID, a link length, start and end node coordinates, a road type (e.g., expressway, toll road, general road, urban road, and suburban road), a road width, the number of lanes, a link travel time, a legal speed limit, and a link cost.

That is, each link is defined to a road segment on map between nodes (e.g., intersecting point, branching point). Use of the node data and link data allows rendering of roads on maps and retrieving of a guide route from a starting point to a destination using a known technique such as the Dijkstra method.

The operation switch group 7 includes touch switches integrated in the display device 12 or mechanical switches and are used to input various inputs (e.g., map scrolling, character input, key selection).

For instance, a starting point, a passing point, or a destination can be designated via the operation switch group 7 to thereby allow the navigation apparatus to execute a route guide function. Here, unless a starting point is intentionally designated, a current position of the vehicle is designated as the starting point. Further, the passing point can be optionally designated.

Upon designation of a starting point and destination, the control circuit 10 retrieves a guide route from the starting point to the destination using, e.g., the Dijkstra method. When starting a route guide along the retrieved guide route is required via the operation switch group 7, the control circuit 10 starts the route guide.

The remote 9 is a remote controller and used, like the operation switch group 7, for various inputs. The remote control sensor 8 receives operation signals from the remote 9 and inputs them to the control circuit 10.

The display device 12 as a display means or unit includes, e.g., a liquid crystal display. A screen of the display device 12 shows a road map generated from the map data inputted from the map data input unit 6. The road map shows a legal speed limit of a road acquired from the map data, a vehicle position mark corresponding to a current position of the vehicle inputted from the position detector 1, and/or congestion information acquired from a road traffic management center such as VICS (Vehicle Information and Communication System) center via the communicator 15, which can be a receiver for information from VICS. Further, a guide route is displayed on the road map in a highlighted form during route guide.

The speech recognition unit 13 recognizes speeches pronounced by a user or occupant to thereby use them for various inputs. The speaker 14 is used for audio guide or the like.

Further, the communicator 15 receives congestion information from VICS center via a beacon laid down in a road or local FM broadcasting station.

The congestion information includes a congestion road section, congestion degrees in individual links, a travel time in the congestion road section, a congestion type (e.g., traffic accident, traffic lane restriction); further, it includes traffic regulation information such as a road closure due to accident or construction and a closure of an entrance/exit in an expressway. The received congestion information is processed by the control circuit 10 and the congestion information and traffic regulation information are shown as being superimposed on the road map. Traffic information transmitted from VICS center includes two types of information for inbound (a driving lane on which the subject vehicle travels) and outbound (oncoming lane). The communicator 15 differentiates the two types based on phases of the received signals.

As explained above, the navigation apparatus of the embodiment displays legal speed limit information and congestion information in addition to a vehicle position mark on a road map displayed in the display device 12. Only displaying of the legal speed limit information and the congestion information does not effectively provide useful information. For instance, multiple roads may be selectable as a route. Here, a user may take a time to comprehensively select one of the selectable roads using the displayed information; otherwise, a user may not select one of the roads since only either information is displayed on a single screen window.

To that end, according to the embodiment, while a road map is displayed in the display device 12, a speed limit display switching process is repeatedly performed with predetermined time intervals. Here, a certain road is designated as indicating speed limit information. Further, If the certain road is assigned with congestion information, a speed limit display of the certain road is switched from a usual display form to a congestion display form different from the usual display form as shown in FIG. 3B. Thus, a user can discern the congestion information and speed limit information with respect to the certain road at the same screen window in one glance.

Figure 2:
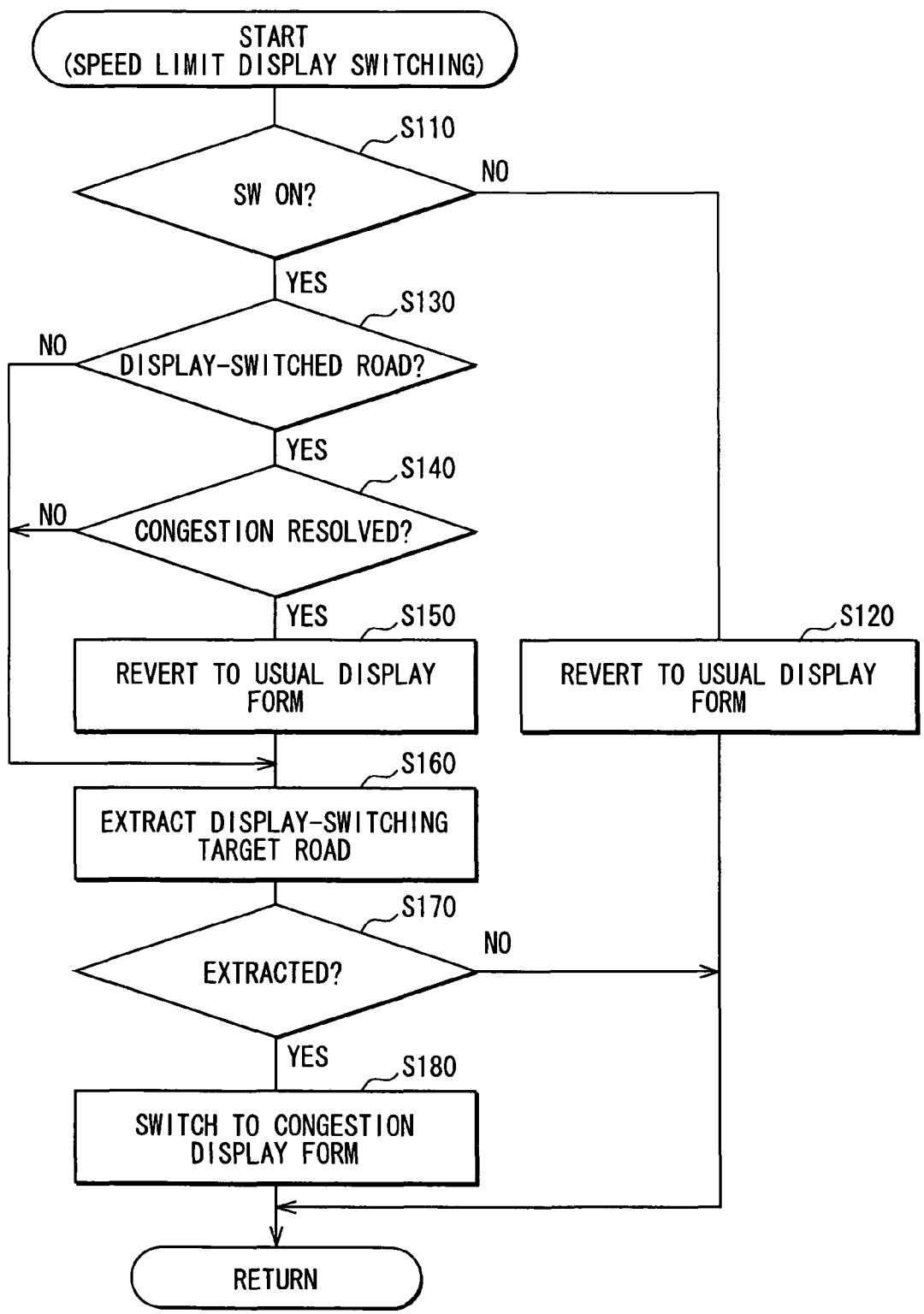
FIG. 2 is a flowchart diagram illustrating a speed limit display switching process.

The speed limit display switching process will be explained with reference to FIG. 2.

At Step S110, it is determined whether a display switch is turned via the operation switch group 7 or remote 9. When the display switch is not turned on, a display form for speed limit information is returned to a usual display form entirely in the display device 12 at Step S120. The process then ends.

In contrast, when the display switch is turned on, it is determined whether a display-switched road is present or not at Step S130. The display-switched road is defined as a road assigned with speed limit information in a congestion display form. When a display-switched road is present, it is determined whether the congestion in the display-switched road is resolved based on congestion information acquired via the communicator 15 at Step S140.

When the congestion in the display-switched road is determined to be resolved (i.e., the display-switched road is not congested), the congestion display form of the speed limit information of the road, in which the congestion is resolved, reverts to a usual display form at Step S150. The process then goes to Step S160.

At Step S160, initial target roads are selected, determination target roads are selected from among the initial target roads, and display-switching target roads are selected from among the determination target roads. In particular, the initial target roads include display target roads and connected roads. The display target roads are defined as roads which are displayed in a screen window in the display device 12 as being assigned with speed limit information. The connected roads are defined as roads which are connected with display target roads and present within a predetermined distance from a current position of the vehicle. The determination target roads are defined as roads, which are selected from among the initial target roads when a first condition and a second condition are both satisfied and regarding which congestion information should be acquired via the communicator 15. The display-switching target roads are defined as roads, which are selected from among the determination target roads and regarding which congestion information has been acquired.

First Condition

As such, the determination target roads are selected from among the initial target roads at least when a first condition is satisfied. The first condition is satisfied when a road is included in the initial target roads and further has predetermined limited differences from a travel road on which the vehicle travels. In other words, the predetermined limited differences include a limited speed limit deference (e.g., equal to or within ±20 km/h), a limited road width difference (e.g., equal to or within ±1 m), and a limited road level difference (e.g., equal to or within ±1).

Second Condition

Likewise, the determination target roads are selected from among the initial target roads at least when a second condition is satisfied. The second condition is satisfied when an initial target road has a limited orientation difference equal to or within ±30 degrees relative to a travel road. Here, the orientation of a road may be a traffic direction of the road.

Figure 3A:
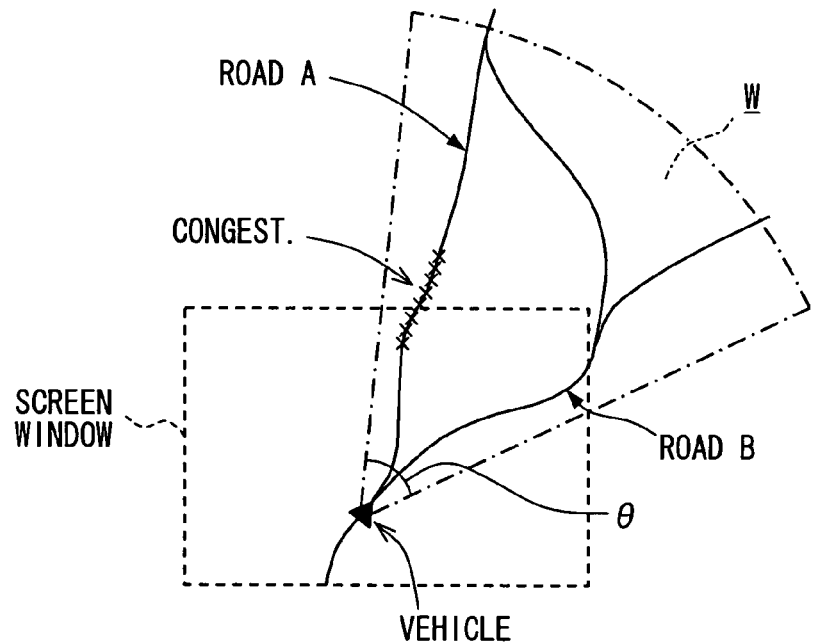
FIGS. 3A, 3B are diagrams for explaining a display according to the embodiment.
Figure 3B:
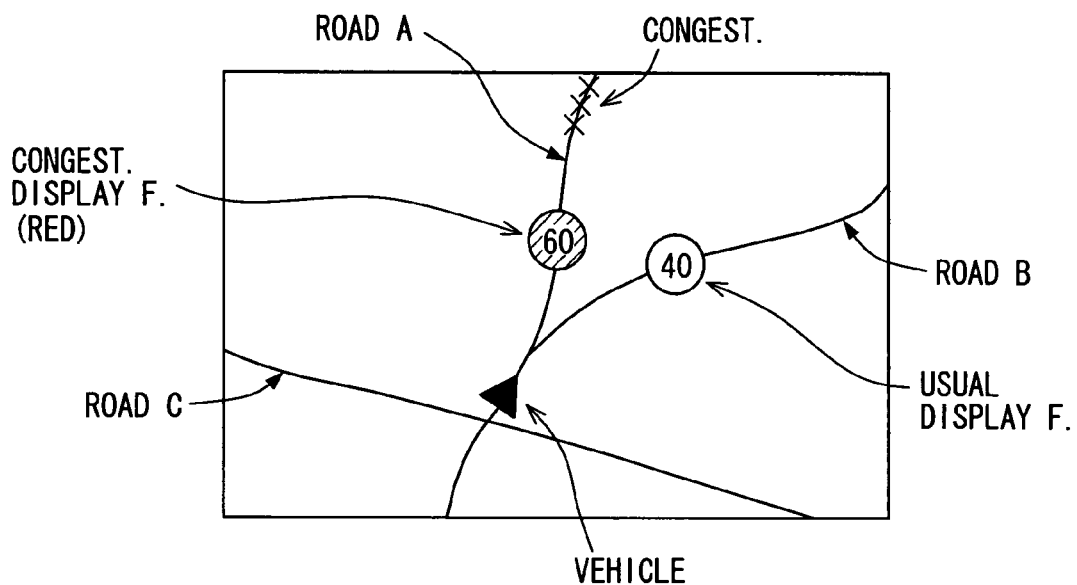

For instance, referring to FIG. 3A, at Step S160, initial target roads, including display target roads and connected roads, are selected within a sector W (i.e., congestion information retrieval region) having a predetermined central angle θ. From among the initial target roads, ROAD A and ROAD B are selected as determination target roads having predetermined limited differences (speed limit difference, road width difference, road level difference) relative to a travel road on which the vehicle travels. Then it is determined whether congestion information is acquired with respect to the determination target roads (i.e., ROAD A, ROAD B). Since congestion information is acquired with respect to only ROAD A, ROAD A is extracted as a display-switching target road.

At Step S170, it is determined whether a display-switching target road is extracted at Step S160. When a display-switching target road is not extracted, the process ends. When a display-switching target road is extracted, a display form of the speed limit information of the extracted display-switching target road is switched to a congestion display form. The process then ends.

As the result, as shown in FIG. 3B, ROAD A, on which the vehicle is going to travel and which has congestion information, is displayed with the speed limit information highlighted as a congestion display form, which is different from a usual display form in the speed limit information of ROAD B having no congestion information. This allows a user to discern both the congestion information and the speed limit information in one glance.

Thus, according to the navigation apparatus of the embodiment, a screen window in FIG. 3B can inform a user of a road circumstance, where two roads (ROAD A, ROAD B) are selectable as a travel road and ROAD A is congested and has a higher speed limit (60 km/h), while ROAD B is not congested and has a lower speed limit (40 km/h). This allows the user to easily or promptly determine which road, ROAD A or ROAD B, should be selected as a travel road.

(Functions)

The map data input unit 6 may function as a map data storing means or unit. The control circuit 10 may function as a display controlling means or unit (i.e., a display controller). The communicator 15 may function as a congestion information acquisition means or unit. Steps S160, S170 in FIG. 2 performed by the control circuit 10 may function as a display-switching target road selection means or unit. Step S180 in FIG. 2 performed by the control circuit 10 may function as a display form switching means or unit.

(Modifications)

For instance, the determination target roads are selected from among the initial target roads when the first condition and the second condition are both satisfied. However, the determination target roads may be selected when only one of the first and second conditions is satisfied. Otherwise, the determination target roads may be selected when one or some of sub-conditions (i.e., predetermined limited differences) included in either the first or second condition are satisfied.

For instance, the initial target roads include display target roads and connected roads. However, the initial target roads may be defined as including only display target roads, which are displayed in a screen window in the display device 12 as being assigned with speed limit information.

For instance, the second condition is satisfied when an initial target road has a limited orientation difference equal to or within ±30 degrees relative to a travel road. However, the second condition may be satisfied when a road is interconnected with both a travel road and another road, which has a limited orientation difference equal to or within ±30 degrees relative to the travel road. Likewise, based on the modified second condition, a road selectable as a travel road in the traveling direction of the vehicle can be extracted as a display-switching target road.

Further, a radius (i.e., predetermined distance from a current position) of sector defined in the second condition may be changed depending on road levels (or types) such as expressway (ranked as a higher level), toll road, general road, urban road, or suburban road (ranked as a lower level); namely, as a road level is higher, the radius is set as being longer.

Further, the congestion display form of the speed limit information may be shown as a red circle. Otherwise, the congestion display form may be shown such that the speed limit information is blinking or highlighted.

Further, when the display form of the speed limit information is switched between the congestion display form and usual display form, an alarm may be outputted via the speaker 14 as an additional informing means.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As an aspect, a road map display system for a vehicle is provided as follows. A position detector is included for detecting a current position of the vehicle. A map data storing unit is included for storing road map data. A display controller is included for displaying a road map, speed limit information of a road, and the current position of the vehicle in a display unit based on the stored road map data. A congestion information acquisition unit is included for acquiring congestion information for a road from an outside information center. A display-switching target road selection unit is included for (i) defining a road, of which speed limit information is displayed by the display controller, as a determination target road, (ii) determining whether congestion information for the determination target road is acquired, and (iii) defining the determination target road, for which congestion information is acquired, as a display-switching target road. A display form switching unit is included for switching a display form of speed limit information of the display-switching target road from a usual display form to a congestion display form for informing a user of a presence of the congestion information.

Under the configuration of the above road map display system, the user or occupant can discern whether the congestion information relative to a certain road is obtained or not by only seeing the speed limit information of the certain road.

For instance, two roads are selectable as a travel road. A first road having a higher speed limit is congested, while a second road having a lower speed limit is not congested. In this case, the user is allowed to easily or promptly determine which road, the first road or second road, should be selected as a travel road, thereby providing an effective driving of the vehicle.

As a first additional feature of the above road map display system, the display-switching target road selection unit is configured to define, as a determination target road, a connected road in addition to the road, of which speed limit information is displayed by the display controller, the connected road being within a predetermined distance from the current position of the vehicle and connected with the road, of which speed limit information is displayed by the display controller. Further, the display-switching target road selection unit is configured to further determine whether congestion information of the connected road is acquired.

For instance, there may be a case where congestion occurs in an outer road segment of a certain road outside the displayed road map but does not occur in an inner road segment of the certain road inside of the displayed road map. In this case, according to the first additional feature, speed limit information of the certain road can be displayed in the congestion display form. This can provide the user with the congestion information more effectively or practically.

Further, for instance, in an expressway ranked as a higher road level, a distance between branching points (e.g., ramps, interchanges, entrances/exits) is longer (e.g., several kilometers to several ten kilometers) in comparison with that (several hundred meters) of a general road or local road ranked as a lower road level.

The predetermined distance from the current position of the vehicle used for defining a connected road may be preferably set as being larger as a road level of the connected road increases.

Further, there may be a case that the determination target roads includes various roads significantly different from each other in a speed limit, a road width, or a road level. This may provide useless information regarding a road the user will not select as a travel road, therefore confusing the user.

Thus, the display-switching target road selection unit may be configured to define, as a determination target road, a road, which has a difference from a travel road on which the vehicle travels, the difference being less than a predetermined value in at least one of a speed limit, a road width, and a road level.

Further, the display-switching target road selection unit may be configured to define, as a determination target road, a road, of which speed limit information is displayed by the display controller and which has a difference from a travel road that the vehicle travels on, the difference being less than a predetermined value in an orientation.

Otherwise, the display-switching target road selection unit may be configured to define, as a determination target road, a second road in addition to a first road, of which speed limit information is displayed by the display controller and which has a difference from a travel road that the vehicle travels on, the difference being less than a predetermined value in an orientation, the second road being connected with the first road and the travel road.

Thus, a road the user will preferably select can be selected as a determination target road, therefore further providing more effective road information to the user.

As another aspect, a method can be provided for superimposing speed limit information on a road map. The method comprises (i) detecting a current position of a vehicle; (ii) displaying a road map, speed limit information of a road, and the current position of the vehicle in a display unit based on road map data; (ii) acquiring congestion information for a road from an outside information center; (iii) defining a road, of which speed limit information is displayed in the display unit, as a determination target road; (iv) determining whether congestion information for the determination target road is acquired; (v) defining the determination target road, for which congestion information is acquired, as a display-switching target road; and (vi) switching a display form of speed limit information of the display-switching target road from a usual display form to a congestion display form for informing a user of a presence of the congestion information.

It will be obvious to those skilled in the art that various changes may be made in the above-described embodiments of the present invention. However, the scope of the present invention should be determined by the following claims.

What is claimed is:

1. A road map display system for a vehicle, comprising:
   a position detector for detecting a current position of the vehicle;
   a map data storing unit for storing road map data;
   a display controller for displaying a road map, speed limit information of a road, and the current position of the vehicle in a display unit based on the stored road map data;
   a congestion information acquisition unit configured to acquire congestion information for a road from an outside information center;
   a display-switching target road selection unit configured to (i) define a road, of which speed limit information is displayed by the display controller, as a determination target road, (ii) determine whether congestion information for the determination target road is acquired, and (iii) define the determination target road, for which congestion information is acquired, as a display-switching target road; and
   a display form switching unit configured to switch a display form of speed limit information of the display-switching target road from a usual display form to a congestion display form for informing a user of a presence of the congestion information.

2. The road map display system of claim 1, wherein:
   the display-switching target road selection unit is configured to define, as a determination target road, a connected road in addition to the road, of which speed limit information is displayed by the display controller, the connected road being within a predetermined distance from the current position of the vehicle and connected with the road, of which speed limit information is displayed by the display controller; and
   the display-switching target road selection unit is configured to further determine whether congestion information of the connected road is acquired.

3. The road map display system of claim 2, wherein the predetermined distance from the current position of the vehicle used for defining a connected road is set as being larger as a road level of the connected road increases.

4. The road map display system of claim 1, wherein the display-switching target road selection unit is configured to define, as a determination target road, a road, which has a difference from a travel road on which the vehicle travels, the difference being less than a predetermined value in at least one of a speed limit, a road width, and a road level.

5. The road map display system of claim 1, wherein
the display-switching target road selection unit is configured to define, as a determination target road, a road, of which speed limit information is displayed by the display controller and which has a difference from a travel road that the vehicle travels on, the difference being less than a predetermined value in an orientation.

6. The road map display system of claim 1, wherein
the display-switching target road selection unit is configured to define, as a determination target road, a second road in addition to a first road, of which speed limit information is displayed by the display controller and which has a difference from a travel road that the vehicle travels on, the difference being less than a predetermined value in an orientation,
the second road being connected with the first road and the travel road.

7. A method for superimposing speed limit information on a road map, the method comprising the steps of:

detecting a current position of a vehicle;
displaying a road map, speed limit information of a road, and the current position of the vehicle in a display unit based on road map data;
acquiring congestion information for a road from an outside information center;
defining a road, of which speed limit information is displayed in the display unit, as a determination target road;
determining whether congestion information for the determination target road is acquired;
defining the determination target road, for which congestion information is acquired, as a display-switching target road; and
switching a display form of speed limit information of the display-switching target road from a usual display form to a congestion display form for informing a user of a presence of the congestion information.

* * * * *